(12) United States Patent
Hutsell

(10) Patent No.: US 7,423,837 B2
(45) Date of Patent: Sep. 9, 2008

(54) MICRO ACTUATOR GAIN CALIBRATION BASED ON A SINUSOIDAL INPUT SIGNAL

(75) Inventor: Larry Hutsell, Loveland, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/682,553

(22) Filed: Mar. 6, 2007

(65) Prior Publication Data

US 2007/0223136 A1  Sep. 27, 2007

Related U.S. Application Data

(60) Provisional application No. 60/743,690, filed on Mar. 23, 2006.

(51) Int. Cl.
*G11B 5/596* (2006.01)
(52) U.S. Cl. .................................. 360/78.05
(58) Field of Classification Search .............. 360/78.12, 360/78.05, 78.01, 75, 69
See application file for complete search history.

(56) References Cited

U.S. PATENT DOCUMENTS 6,510,752 B1 * 1/2003 Sacks et al. ................. 73/865.9

* cited by examiner

*Primary Examiner*—Fred Tzeng
(74) *Attorney, Agent, or Firm*—Myers Bigel Sibley & Sajovec, PA

(57) ABSTRACT

Control of micro actuator movement is calibrated in response to a sinusoidal input signal. A response of the micro actuator to the sinusoidal input signal is measured, for example, based on measurement of a change in radial location of a transducer connected to the micro actuator responsive to the sinusoidal input signal. Control of the movement of the micro actuator is calibrated based on the measured response of the micro actuator to the sinusoidal input signal. For example, a gain of a micro actuator control loop that controls movement of the micro actuator may be regulated based on the measured change in radial location of the transducer. Related circuits and devices are also discussed.

28 Claims, 8 Drawing Sheets

MICRO ACTUATOR GAIN CALIBRATION BASED ON A SINUSOIDAL INPUT SIGNAL

RELATED APPLICATION

This application claims the benefit of and priority to U.S. Provisional Patent Application Ser. No. 60/743,690, filed Mar. 23, 2006, the disclosure of which is hereby incorporated herein by reference as if set forth in its entirety.

FIELD

The present invention generally relates to data storage devices and, more particularly, to the calibration of micro actuators therein.

BACKGROUND

Disk drives are digital data storage devices which may allow host computers to store and retrieve large amounts of data in a fast and efficient manner. A typical disk drive may include a plurality of magnetic recording disks which are mounted to a rotatable hub of a spindle motor and rotated at a high speed. Information may be stored on each disk in concentric tracks. The data tracks are usually divided into sectors. Information may be written to and/or read from a storage surface(s) of a disk by a transducer or head. The transducer may include a read element separate from a write element, or the read and write elements may be integrated into a single read/write element. The transducer may be mounted on an actuator arm capable of moving the transducer radially over the disk. Accordingly, the movement of the actuator arm may allow the transducer to access different data tracks. The disk may be rotated by the spindle motor at a relatively high speed, which may allow the transducer to access different sectors within each track on the disk.

The actuator arm may be coupled to a motor or coarse actuator, such as a voice coil motor (VCM), to move the actuator arm such that the transducer moves radially over the disk. Operation of the coarse actuator may be controlled by a servo control system. The servo control system generally performs two distinct functions: seek control and track following. The seek control function includes controllably moving the actuator arm such that the transducer is moved from an initial position to a target track position. In general, the seek function may be initiated when a host computer associated with the computer disk drive issues a seek command to read data from or write data to a target track on the disk.

As the transducer approaches the target track, the servo control system may initiate a settle mode to bring the transducer to rest over the target track within a selected settle threshold, such as a percentage of the track width from track center. Thereafter, the servo control system may enter the track following mode, where the transducer is maintained at a desired position with respect to the target track (e.g., over a centerline of the track) until desired data transfers are complete and another seek is performed.

The ability to precisely position a transducer with respect to a track being followed has become increasingly important as data and track densities in disk drives have increased. In particular, the space between adjacent tracks has become increasingly small, and the tracks themselves have become increasingly narrow. In order to increase the precision with which a transducer may be positioned with respect to a track during track following, an articulated actuator arm may be used. In general, the angle of the distal portion, or second stage, of the actuator arm with respect to the main portion, or first stage, of the actuator arm may be controlled by a micro actuator. The micro actuator may have a faster response than the coarse actuator to command signals, but may have a comparatively small range of movement. Thus, by operating the micro actuator to introduce small changes in the position of the transducer with respect to a track being followed, the accuracy of track following operations may be increased.

Because the location of the transducer is a combination of the contributions of the coarse actuator and the micro actuator, the position of the micro actuator within its relatively small range of motion typically may not be directly observable. Accordingly, the current position and response of the micro actuator to movement commands may be estimated through a model of the micro actuator. As such, the accuracy of the estimated response of the micro actuator to movement commands may substantially affect the precision with which the transducer can be positioned relative to a track.

For example, in some conventional techniques for estimating a response of the micro actuator, the coarse actuator may be used to maintain a desired position of the transducer relative to a target track, while a step function may be applied to the micro actuator. The resulting output position of the transducer responsive to the application of the step function to the micro actuator may be measured and used to calculate the gain of the micro actuator. A number of output positions may be measured to provide an average calibrated measurement. However, such techniques may not provide consistent results, as the coarse actuator may attempt to counteract the movement of the transducer caused by the response of the micro actuator, which may corrupt the measured output position. In addition, such techniques may be relatively slow, as it may be necessary to wait for the response of the coarse actuator to settle prior to the application of the next step function.

SUMMARY

According to some embodiments, control of micro actuator movement is calibrated by providing a sinusoidal input signal to the micro actuator. A response of the micro actuator to the sinusoidal input signal is measured, for example, based on measurement of a change in radial location of a transducer connected to the micro actuator responsive to the sinusoidal input signal. Control of the movement of the micro actuator is calibrated based on the measured response of the micro actuator to the sinusoidal input signal. For example, a gain of a micro actuator control loop that controls movement of the micro actuator may be regulated based on the measured change in radial location of the transducer.

According to some other embodiments, a circuit includes a controller that controls movement of a micro actuator. The controller measures a response of the micro actuator to a sinusoidal input signal, and calibrates control of the micro actuator movement based on the measured response of the micro actuator to the sinusoidal input signal.

According to some further embodiments, a disk drive includes a rotatable data storage disk, a transducer that is adjacent to the rotatable storage disk, a micro actuator that positions the transducer over a first range of movement, a coarse actuator that positions the micro actuator over a second range of movement that is larger than the first range of movement, and a controller that controls positioning of the transducer by the coarse actuator based on a coarse actuator control loop and by the micro actuator based on a micro actuator control loop. The controller measures an open loop response of the micro actuator control loop to a sinusoidal input signal, and calibrates a gain of the micro actuator control loop based on the measured open loop response.

DETAILED DESCRIPTION

The present invention now will be described more fully hereinafter with reference to the accompanying drawings, in which embodiments of the invention are shown. This invention may, however, be embodied in many alternate forms and should not be construed as limited to the embodiments set forth herein.

Accordingly, while the invention is susceptible to various modifications and alternative forms, specific embodiments thereof are shown by way of example in the figures and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like numbers refer to like elements throughout the description of the figures.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. As used herein the terms "and/or" and "/" include any and all combinations of one or more of the associated listed items. It will be understood that, although the terms first, second, etc. may be used herein to describe various elements and/or regions, these elements and/or regions should not be limited by these terms. These terms are only used to distinguish one element/region from another element/region. Thus, a first element/region discussed below could be termed a second element/region without departing from the teachings of the present invention.

The present invention may be embodied in hardware and/or in software (including firmware, resident software, microcode, etc.). Consequently, as used herein, the term "signal" may take the form of a continuous waveform and/or discrete value(s), such as digital value(s) in a memory or register.

The present invention is described below with reference to block diagrams of disk drives, disks, controllers, and operations according to various embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show what may be a primary direction of communication, it is to be understood that communication may occur in the opposite direction to the depicted arrows.

Figure 1A:
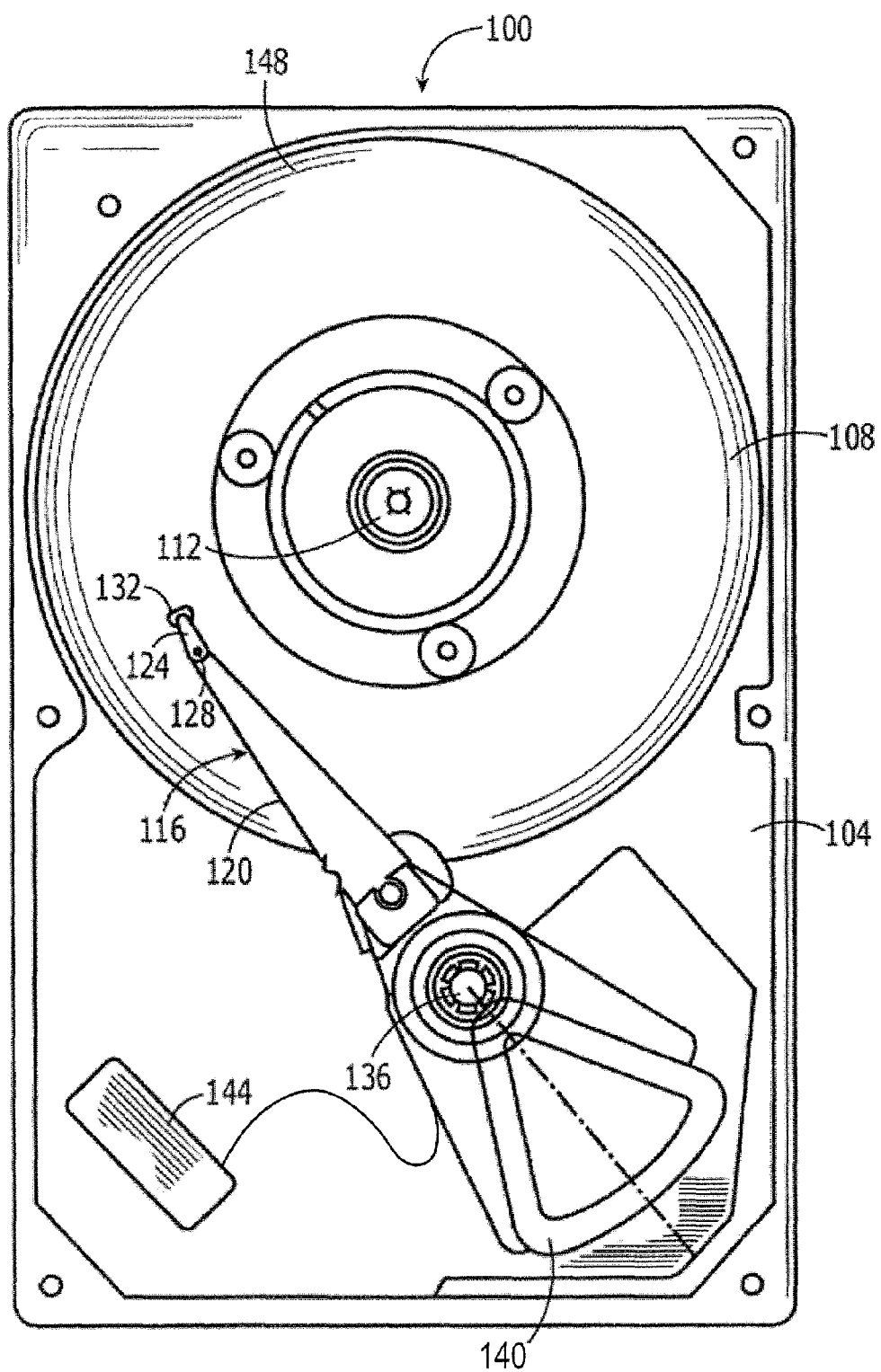
FIG. 1A is a plan view of a disk drive including electronic circuits that are configured in accordance with some embodiments.

A simplified diagrammatic representation of a disk drive is illustrated in FIG. 1A. The disk drive, generally identified by reference number 100, includes a base 104 and one or more data storage disks 108 (only one of which is shown in FIG. 1A). The disk 108 may be a magnetic disk, an optical disk, or any other type of data storage disk, and may have data storage tracks defined on one or both of its storage surfaces. The disk 108 is interconnected to the base 104 by a spindle motor (not shown) mounted within or beneath a hub 112, such that the disk 108 can be rotated relative to the base 104.

An actuator arm assembly 116 includes a first member 120 and a second member 124. The first member 120 is coupled between the base 104 and the second member 124, and the members 120 and 124 can provide two stages of movement. Interconnecting the first stage 120 and the second stage 124 of the actuator arm assembly 116 is a micro actuator 128. A transducer (or head) 132 is mounted on a distal portion of the actuator arm assembly 116. In particular, the transducer 132 can be coupled to an end of the second member 124 of the actuator arm assembly 116 so that it can be positioned adjacent to a storage surface of the disk 108. The transducer 132 may, for example, include a magnetoresistive (MR) element and/or a thin film inductive (TFI) element.

The first member 120 of the actuator arm assembly 116 can be interconnected to the base 104 by a bearing 136. A coarse actuator 140 can pivot the actuator arm assembly 116 about the bearing 136 to position the micro actuator 128 and, thereby, position the transducer 132 with respect to the disk 108. In particular, the coarse actuator 140 positions the transducer 132 to allow it to access different data tracks or cylinders 148 on the disk 108. Accordingly, the coarse actuator 140 can position the micro actuator 128 and, thereby, the transducer 132 over a range of movement that may correspond to the distance between an inner and outer data storage track of the storage surface of the disk 108. The coarse actuator 140 may be, for example, a motor, such as a voice coil motor (VCM).

The articulation of the second member 124 with respect to the first member 120 of the actuator arm assembly 116 may be achieved, for example, by providing a journal bearing as part of the micro actuator 128, by providing a flexible interconnection between the second member 124 and the first member 120, or by otherwise joining the second member 124 to the first member 120 in such a way that the second member 124 is allowed to move with respect to the first member 120.

The micro actuator 128 is configured to position the transducer 132 relative to the disk 108 over a range of movement that is less than the range of movement provided by the coarse actuator 140. As such, the micro actuator 128 may affect finer positioning and/or higher frequency movements of the transducer 132 within its range of movement (e.g., over relatively short distances), such as that which may be encountered during short seeks (e.g., a few tracks) or during track following. Accordingly, the micro actuator 128 may move the transducer 132 faster across the disk 108, within its range of movement, than may be possible with the coarse actuator 140. In some embodiments, the second member 124 may be eliminated by directly connecting the transducer 132 to a surface or extension of the micro actuator 128. The micro actuator 128 may be any mechanism capable of moving the transducer 132 relative to the disk 108, such as by adjusting the second member 124 of the actuator arm assembly 116 with respect to the first member 120. For example, the micro actuator 128 may be a piezoelectric actuator, an electromagnetic actuator, or an electrostatic actuator.

Figure 1B:
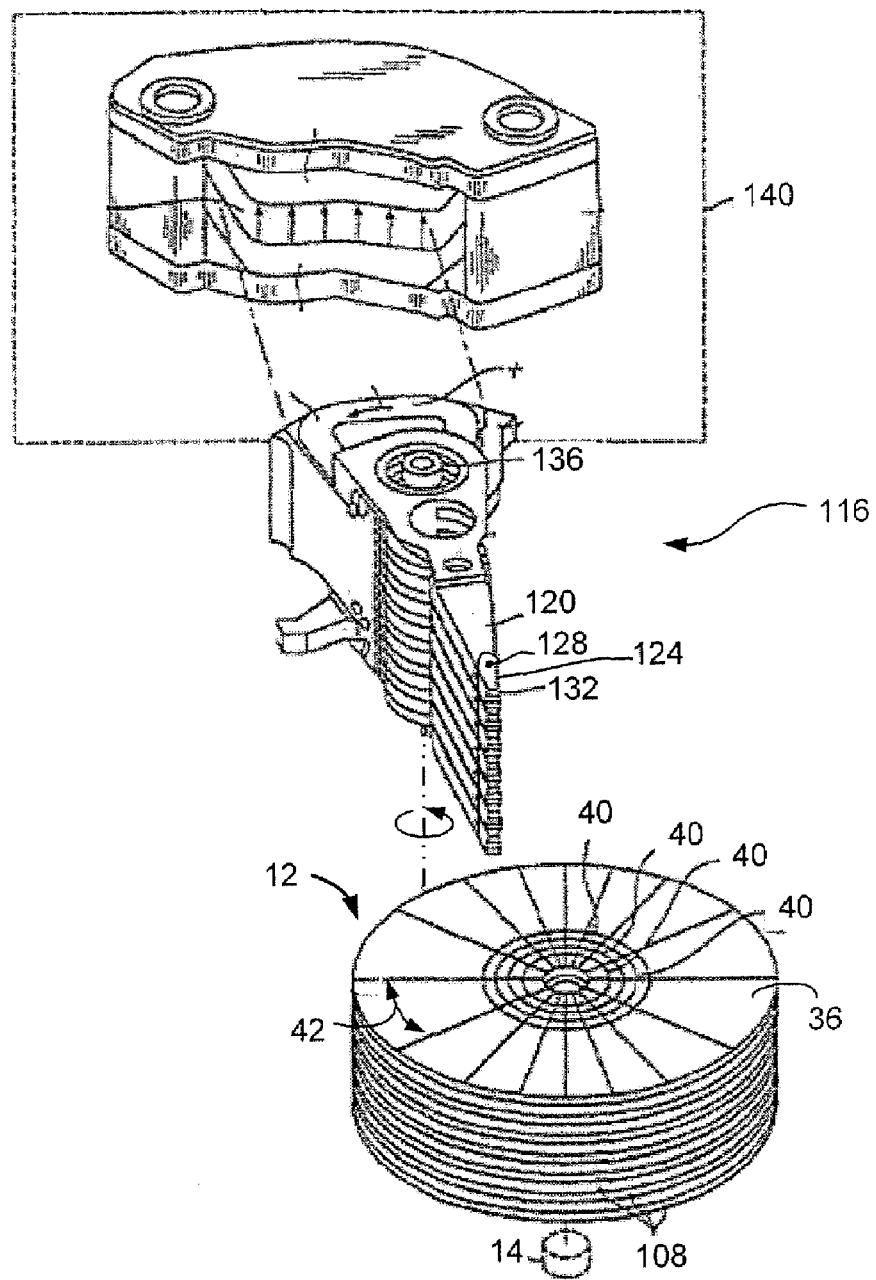
FIG. 1B is an exploded view of portions of the disk drive of FIG. 1A.

FIG. 1B is an exploded view further illustrating portions of the disk drive 100 of FIG. 1A. Referring now to FIG. 1B, a disk stack 12 typically includes a plurality of disks 108, each of which may have a pair of disk surfaces 36. The disks 108 are mounted on a cylindrical shaft and are rotated about an axis by the spindle motor 14. Data is stored on the disks 108 within a number of concentric tracks 40 (or cylinders). Each track 40 is divided into a plurality of radially extending sectors 42. Each sector is further divided into a plurality of data sectors defined between adjacent servo spokes. The servo spokes are used to, among other things, accurately position the transducer 132 so that data can be properly written onto and read from a selected track. The data sectors may be used to store and retrieve non-servo related data (i.e., host device data).

Still referring to FIG. 1B, the actuator arm assembly 116 includes a plurality of first and second members 120 and 124, micro actuators 128, and transducers 132. Each transducer 132 is mounted to a corresponding one of the second members 124, and is positioned to be adjacent to a different one of the disk surfaces 36. The coarse actuator 140 and the micro actuators 128 respectively operate to move the first and second members 120 and 124 of the actuator arm assembly 116 to thereby move the transducers 132 across their respective disk surfaces 36. The transducers 132 are configured to fly on an air cushion relative to the data recording surfaces 36 of the rotating disks 108 while writing data to the data recording surface responsive to a write command from a host device or while reading data from the data recording surface to generate a read signal responsive to a read command from the host device.

Referring again to FIG. 1A, a controller 144 is coupled to the actuator arm assembly 116. The controller 144 can control movement of the transducer 132 relative to the disk 108 via the coarse actuator 140 and/or the micro actuator 128. More particularly, the controller 144 may control the coarse actuator 140 and the micro actuator 128 to position the transducer 132 along a desired data storage track of the disk 108. The controller 144 moves the transducer 132 in two primary modes: a seek mode and a track following mode. During the seek mode, the controller 144 can be configured to move the transducer 132 from an initial track to a target track on the disk 108 for which the host device has requested access using the coarse actuator 140, the micro actuator 128, and/or a combination thereof. During the track following mode, the controller 144 can control the coarse actuator 140 and the micro actuator 128 to position and maintain the transducer 132 over a defined radial location along a track on the disk. The controller 144 may include read/write channel circuits and/or other associated analog circuitry and/or digital circuitry, such as a gate array and/or microprocessor-based instruction processing device.

As will be discussed in further detail below, in some embodiments, the micro actuator 128 may be a piezoelectric transducer (PZT) element. The position response of the micro actuator 128 to an input signal is referred to hereinafter as the micro actuator gain. The micro actuator gain may vary substantially for different PZT elements and/or may vary over time, and as such, may benefit from calibration. According to various embodiments, the controller 144 may calibrate control of the micro actuator 128 movement by providing a sinusoidal input signal to the micro actuator 128 and measuring a response of the micro actuator 128. For example, the controller 144 may measure changes in the radial location or position of the transducer 132 responsive to the sinusoidal signal that is input to the micro actuator 128, and may calculate the gain of the micro actuator 128 based on a discrete Fourier transform (DFT) of the measured changes. The controller 144 may use the calculated gain and an expected gain to adjust the overall gain of a micro actuator control loop that controls movement of the micro actuator 128.

Figure 2:
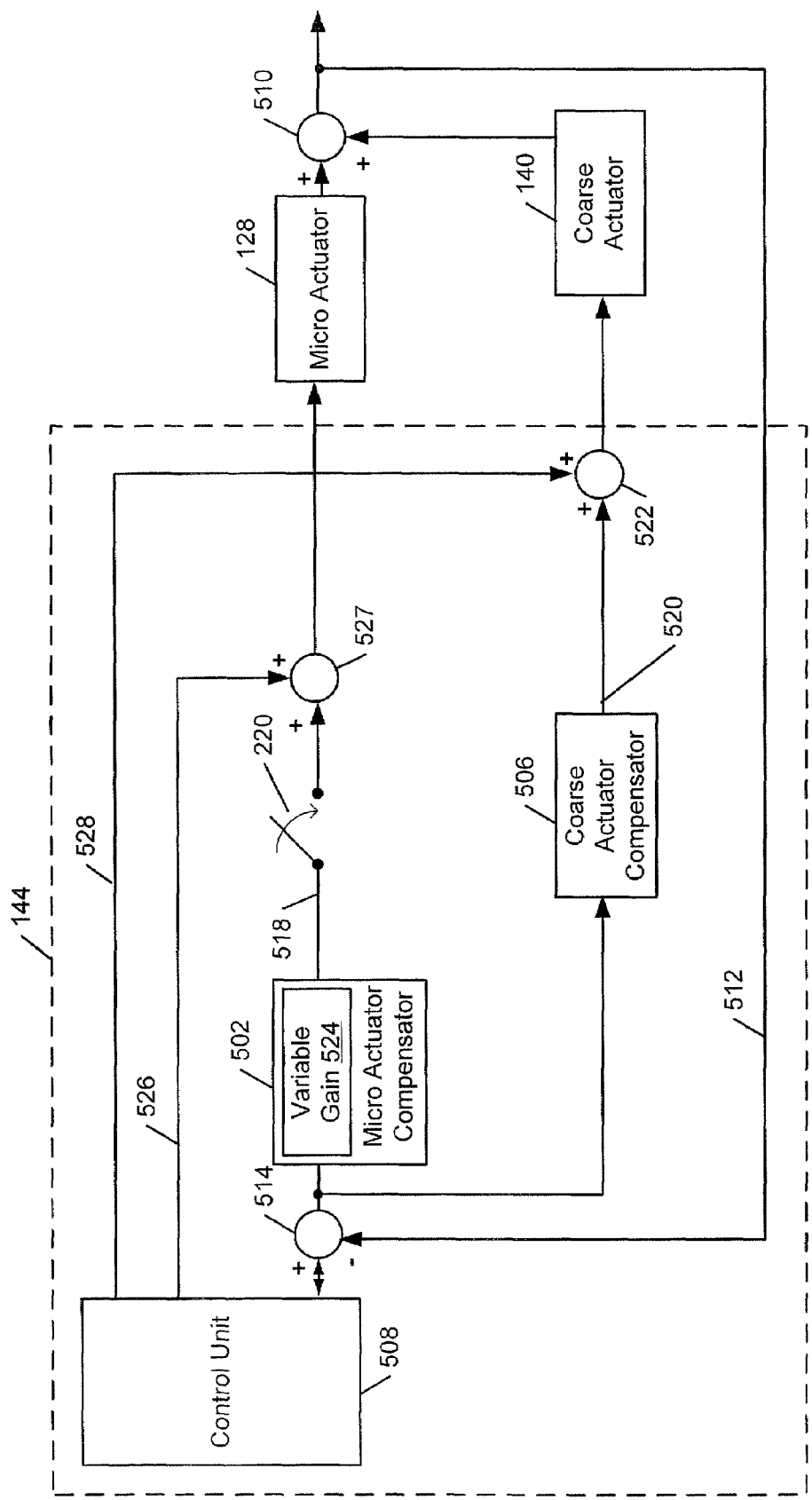
FIG. 2 is a block diagram illustrating a controller and associated control loops of a coarse actuator and a micro actuator according to some embodiments.

FIG. 2 is a block diagram further illustrating the controller 144 of FIG. 1A. As shown in FIG. 2, the controller 144 includes a micro actuator compensator 502, a coarse actuator compensator 506, and a control unit 508. The micro actuator compensator 502 and the micro actuator 128 define a micro actuator control loop that controls movement of the micro actuator 128, while the coarse actuator compensator 506 and the coarse actuator 140 define a coarse actuator control loop that controls movement of the coarse actuator 140. More particularly, the coarse actuator compensator 506 controls movement of the coarse actuator 140 via a coarse actuator control signal 520, and the micro actuator compensator 502 controls movement of the micro actuator 128 via a micro actuator control signal 518. The controller 144 may be embodied as hardware and/or software.

The movement of the transducer 132 relative to a track depends on a summation, indicated by summing node 510, of the contributions of the micro actuator 128 and the coarse actuator 140. Accordingly, the movement of the transducer 132 in response to the control signals 518 and 520 may depend on the respective gains of the micro actuator control loop and the coarse actuator control loop. In accordance with some embodiments, the micro actuator control loop includes a variable gain 524 in the micro actuator compensator 502 that may be adjusted to control positioning of the transducer 132 by the micro actuator 128. Because the contribution of the micro actuator control loop may not be independently observed, the controller 144 may estimate the response of the micro actuator 128 to a movement command, such as a sinusoidal input signal, based on measurement of the transducer 132 movement.

More particularly, in some embodiments, the control unit 508 controls the coarse actuator 140 and/or the micro actuator 128 to move the transducer 132 from an initial position to a desired radial location on a target track of a disk, for example, using the seek function. The control unit 508 then maintains the transducer 132 at the desired radial location relative to a target track using only (or substantially only) the coarse actuator 140. For example, the control unit 508 may activate the switch 220 to an open position to render the micro actuator control loop in an open loop mode, so that the transducer 132 may follow the target track based only on the contributions of the coarse actuator 140 and the coarse actuator compensator 506 of the coarse actuator control loop. As such, a position signal 512 representing the transducer location relative to the target track is not fed-back to the micro actuator 128. The control unit 508 then generates a sinusoidal movement command signal 526 that is provided to an input of the micro actuator 128 via a summing node 527, to cause the micro actuator 128 to move. The control unit 508 measures the changes in radial location of the transducer 132 responsive to the sinusoidal input signal 526 based on the position signal 512, and regulates the variable gain 524 in the micro actuator compensator 502 based on the measured changes in radial location.

Still referring to FIG. 2, the control unit 508 may measure changes in radial location of the transducer 132 by measuring changes in a position error signal generated from a read signal from the transducer 132. More particularly, the control unit 508 may sense the position of the transducer 132 relative to a track via the sensed position signal 512 based on, for example, servo patterns along the track. The sensed position signal 512 is fed-back to the control unit 508, where it is combined with a desired reference position signal to generate a position error signal indicating changes in radial position of the transducer. For example, during a track following mode, the desired reference position signal may be a DC value, such as zero, to drive the transducer 132 toward a centerline of the track. Thus, the position error signal may indicate changes in the radial position of the transducer 132 relative to the centerline of the track.

Figure 3A:
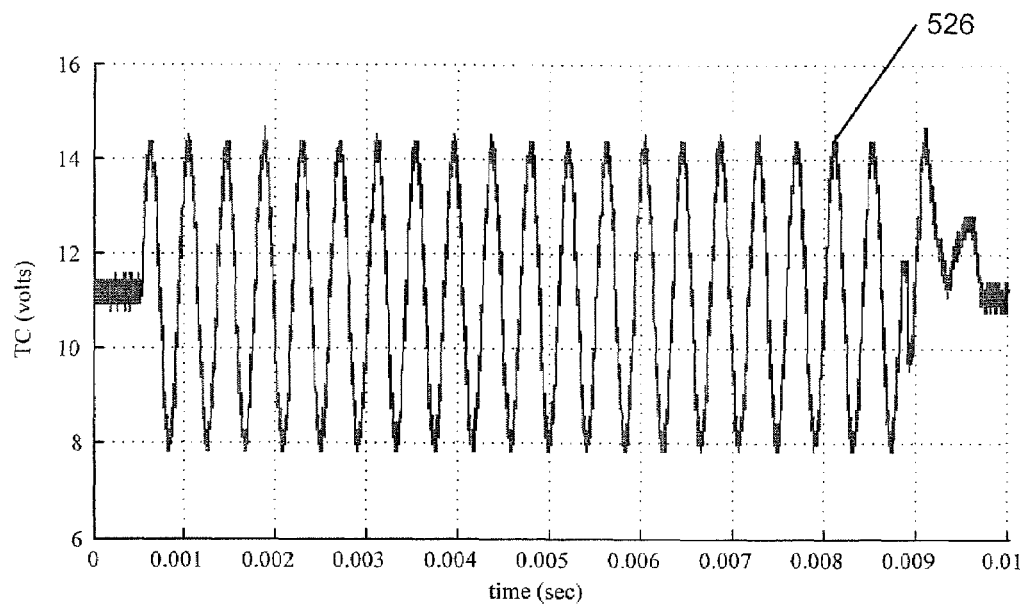
FIG. 3A is a graph illustrating an example of a sinusoidal input signal for calibrating control of movement of a micro actuator according to some embodiments.
Figure 3B:
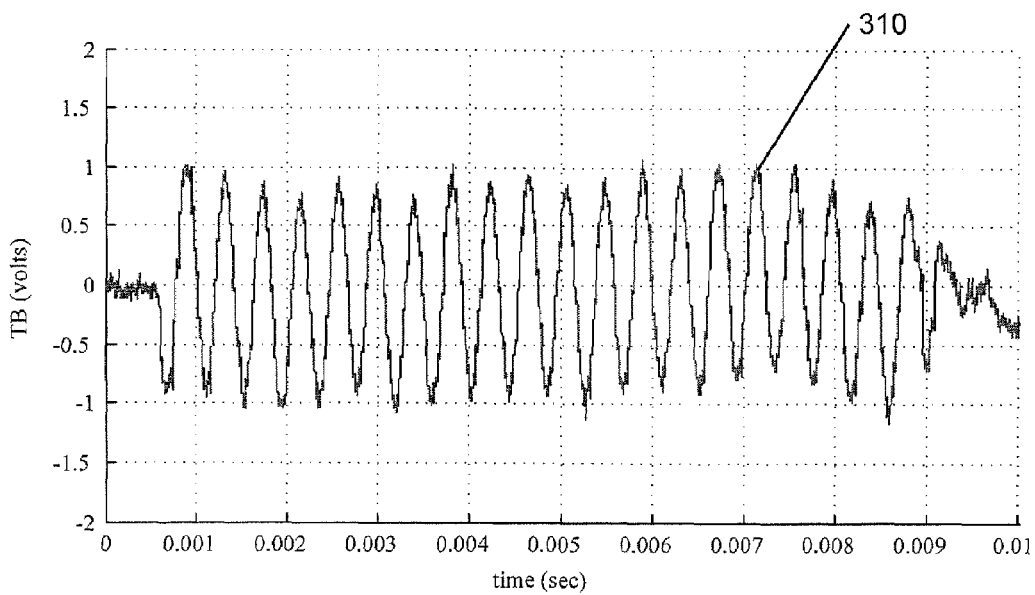
FIG. 3B is a graph illustrating an example of a position error signal of a transducer in accordance with some embodiments generated in response to the sinusoidal input signal of FIG. 3A.

FIG. 3A is a graph illustrating an example of a sinusoidal input signal 526 that may be provided the micro actuator 128, while FIG. 3B is a graph illustrating an example of a position error signal 310 representing the movement of the transducer 132 in response to application of the sinusoidal input signal 526. In FIGS. 3A and 3B, the x-axis represents sampled times in the simulation, and the y-axis represents the amplitude of the sinusoidal input signal 526 that is provided to the micro actuator 128 (FIG. 3A) and the amplitude of the position error signal 310 that is generated from a read signal from the transducer 132 (FIG. 3B).

Referring to FIG. 3A, as discussed above, the sinusoidal input signal 526 is applied to the micro actuator 128 of FIG. 2 while the micro actuator control loop is in an open loop mode and the transducer 132 is positioned under control of the coarse actuator control loop only. The sinusoidal input signal 526 may have a predetermined amplitude and/or frequency. For example, in some embodiments, the response bandwidth of the coarse actuator control loop may be between about 500 Hz to about 800 Hz. Because the micro actuator control loop can respond to higher frequency components than can the coarse actuator 140 and coarse actuator compensator 506, it may be advantageous for the frequency of the sinusoidal input signal 526 to be greater than the response bandwidth of the coarse actuator control loop, so that substantially all of the movement of the transducer 132 in response to the sinusoidal input signal 526 can be attributed to positioning by the micro actuator 128. In other words, a sinusoidal input signal 526 having a sufficiently high frequency that can be tracked by the micro actuator 128 but not by the coarse actuator 140 may be preferable in accordance with some embodiments. The frequency of the sinusoidal input signal 526 may also be chosen to be substantially similar to the open loop cross-over frequency of the micro actuator control loop. Accordingly, as shown in FIG. 3A, a sinusoidal input signal 526 having a frequency of about 2.4 kHz is provided. As such, the response of the micro actuator 128 to the sinusoidal input signal 526 may be somewhat isolated from effects of the coarse actuator 140, and the contribution of the coarse actuator control loop to the movement of the transducer 132 may be reduced and/or minimized.

Referring now to FIG. 3B, the position error signal 310 indicates changes in radial location of the transducer 132 responsive to the sinusoidal input signal 526 provided to the micro actuator 128. As noted above, the position error signal 310 may be generated based on a read signal from the transducer 132. As shown in FIG. 3B, the position error signal 310 has the same frequency as the sinusoidal input signal 526, but has a different amplitude. Accordingly, a gain of the micro actuator 128 can be calculated based on the amplitude of the position error signal 310 and the amplitude of the sinusoidal input signal 526, as discussed in greater detail below.

Referring again to FIG. 2, in some embodiments, the controller 144 may apply a discrete Fourier transform (DFT) algorithm to measurements of the changes in radial position of the transducer 132 caused by movement of the transducer 132 in response to the sinusoidal input signal 526. More particularly, the control unit 508 may apply a DFT algorithm to the position error signal 310 to measure an output amplitude representing the movement of the transducer 132 away from the centerline of the track in response to the sinusoidal input signal 526. It is to be understood, however, that other known algorithms, in addition to or instead of the DFT algorithm, may also be used to measure the amplitude of the position error signal. For example, other amplitude measurement techniques may include monitoring the position error signal for a predetermined number of cycles and recording the largest point (peak detection) and/or the most positive point and the most negative point (peak-to-peak detection). The control unit 508 may thereby determine a measured gain for the micro actuator 128 based on a ratio of the measured output amplitude and the amplitude of the sinusoidal input signal 526.

Based on the measured micro actuator gain and an expected and/or desired micro actuator gain, the control unit 508 may calculate a gain adjustment for the micro actuator control loop. The expected micro actuator gain may be based on, for example, specifications provided by a manufacturer or vendor of the micro actuator 128. For instance, the expected micro actuator gain may be based on an average gain for a plurality of similar micro actuators. Accordingly, the control unit 508 may adjust the gain 524 of the micro actuator compensator 502 based on the calculated gain adjustment, and the micro actuator compensator 502 may provide the micro actuator control signal 518 to the micro actuator 128 based on the adjusted gain 524 to equalize the movement of the micro actuator 128 in accordance with the expected and/or desired micro actuator gain.

Still referring to FIG. 2, as noted above, the position of the transducer 132 relative to a track depends on a summation of the contributions of the micro actuator 128 and the coarse actuator 140 at summing node 510. As such, the measured changes in the radial location of the transducer 132 due to the application of the sinusoidal input signal 526 to the micro actuator 128 may include at least some movement that may be attributable to the response of the coarse actuator control loop. Thus, in some embodiments, the controller 144 may also estimate a contribution of the coarse actuator control loop to the movement of the transducer 132 in response to the sinusoidal input signal 526 in calculating the gain adjustment for the micro actuator control loop.

To estimate the contribution of the coarse actuator control loop, the control unit 508 may activate the switch 220 to an open position to inhibit feedback of the position signal 512 representing the transducer location relative to the target track to the micro actuator 128. As such, the transducer 132 may follow the target track based only on the contribution of the coarse actuator control loop. The control unit 508 may then inject a sinusoidal input signal 528 into the coarse actuator control loop via summing node 522, and may measure the response of the coarse actuator control loop while the micro actuator 128 remains undriven. The sinusoidal input signal 528 may be substantially similar in frequency and/or amplitude to the sinusoidal input signal 526 provided to the micro actuator 128. Also, although illustrated as provided to the coarse actuator control loop via the summing node 522, the sinusoidal input signal 528 may be introduced into the coarse actuator control loop at other locations.

In some embodiments, the control unit 508 may measure the response of the coarse actuator control loop using a discrete Fourier transform (DFT) algorithm in a manner similar to that discussed above with reference to the micro actuator control loop. More particularly, responsive to providing the sinusoidal input signal 528 to the coarse actuator control loop, the control unit 508 may generate a position error signal indicating changes in radial position of the transducer 132 based on the position signal 512 from the transducer 132. The control unit 508 may then apply the DFT algorithm to measure changes in the position error signal caused by movement of the transducer 132 away from the predetermined radial location in response to the sinusoidal input signal 528, and may determine the closed loop transfer function of the coarse actuator control loop based on the DFT of the position error signal and the sinusoidal input signal 528.

Figure 4:
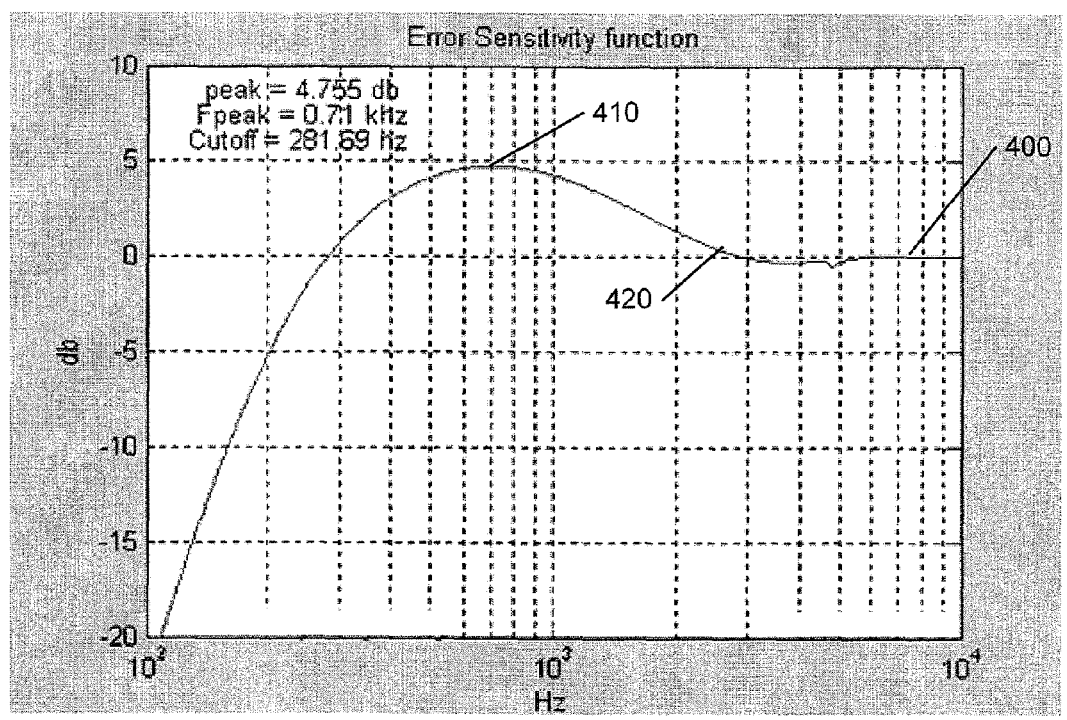
FIG. 4 is a graph illustrating an example of a transfer function for a coarse actuator control loop in accordance with some embodiments.

FIG. 4 is a graph illustrating the closed loop transfer function 400, also referred to as the error transfer function (ETF), of the coarse actuator control loop according to some embodiments. The closed loop transfer function 400 illustrates the gain of the coarse actuator control loop over its response bandwidth. As shown in FIG. 4, there is little movement of the transducer 132 at frequencies below about 100 Hz. More particularly, in the lower frequency ranges, the coarse actuator control loop moves in a manner to mask or "null" the movement of the transducer 132 due to the micro actuator 128, thereby lowering the signal-to-noise ratio. A peak gain 410 of the coarse actuator control loop occurs at a frequency of about 700 Hz. However, the response of the coarse actuator control loop is somewhat stabilized at frequencies above about 2.4 kHz 420, which may be substantially equal to the crossover frequency for the micro actuator control loop. In other words, at frequencies above about 2.4 kHz 420, the coarse actuator control loop contributes relatively little to the movement of the transducer 132. Accordingly, in some embodiments, it may be advantageous during calibration of the variable gain 524 of the micro actuator compensator 502 to provide a sinusoidal input signal to the micro actuator 128 having a frequency of about 2.4 kHz or higher to reduce and/or minimize the contribution of the coarse actuator control loop to the movement of the transducer 132. However, because the gain of the coarse actuator control loop may be estimated in the calculation of the gain adjustment for the micro actuator control loop, sinusoidal input signals of other frequencies may also be provided to the micro actuator 128 in accordance with some embodiments.

Referring again to FIG. 2, the control unit 508 may calculate the micro actuator gain adjustment based on the measured micro actuator gain, the expected micro actuator gain, and the gain of the coarse actuator control loop at the frequency of the sinusoidal input signal 526. In some embodiments, the control unit 508 calculates the gain adjustment for the micro actuator control loop based on the following equation:

$$K_{adjustment} = (K_{expected} \times K_{ETF}) / K_{measured},$$

where $K_{adjustment}$ is the gain adjustment for the micro actuator control loop, where $K_{measured}$ is the measured gain of the micro actuator, where $K_{expected}$ is the expected micro actuator gain, and where $K_{ETF}$ is the gain of the coarse actuator control loop. In addition, as the amplitude of the sinusoidal input signal is known, the gain adjustment can be represented by:

$$K_{adjustment} = (A_{expected} \times K_{ETF}) / A_{measured},$$

where $A_{measured}$ is the measured amplitude based on the DFT output, and where $A_{expected}$ is the expected amplitude. The control unit 508 may thereby adjust the gain 524 of the micro actuator compensator 502 based on the calculated gain adjustment $K_{adjustment}$ to calibrate control of the movement of the micro actuator 128.

In some embodiments, the control unit 508 may perform the calibration process at a plurality of radial locations across the disk 108. More particularly, the control unit 508 may position the transducer 132 at a radial location along a first target track (e.g., a track toward the inner diameter of the disk 108), and may measure the changes in radial location of the transducer 132 relative to the first target track responsive to providing the sinusoidal input signal 526 to the micro actuator 128, as discussed above. The control unit 508 may also position the transducer 132 at a radial location along a second target track (e.g., a track toward the outer diameter of the disk 108), and may similarly measure the changes in radial location of the transducer 132 relative to the second target track responsive to providing the sinusoidal input signal 526 to the micro actuator 128. The control unit 508 may thereby calculate the gain adjustment for the micro actuator control loop based on the respective measured changes in radial location of the transducer 132 relative to both the first and second target tracks, for example, based on an average of the respective measured changes in radial location. Also, in some embodiments, the control unit 508 may apply sinusoidal input signals having different amplitudes and/or frequencies to the micro actuator 128 for each of the different radial locations, and may calculate the gain adjustment based on the respective micro actuator gain calculations for each of the different radial locations.

Figure 5A:
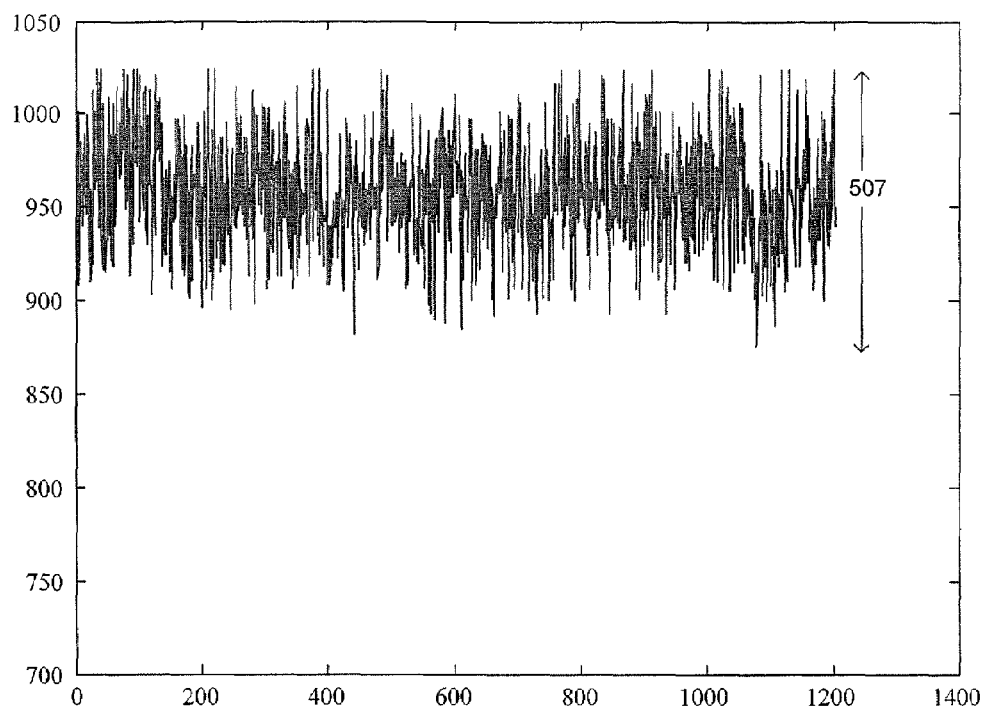
FIG. 5A is a graph illustrating repeatability results for conventional methods of micro actuator gain calibration.
Figure 5B:
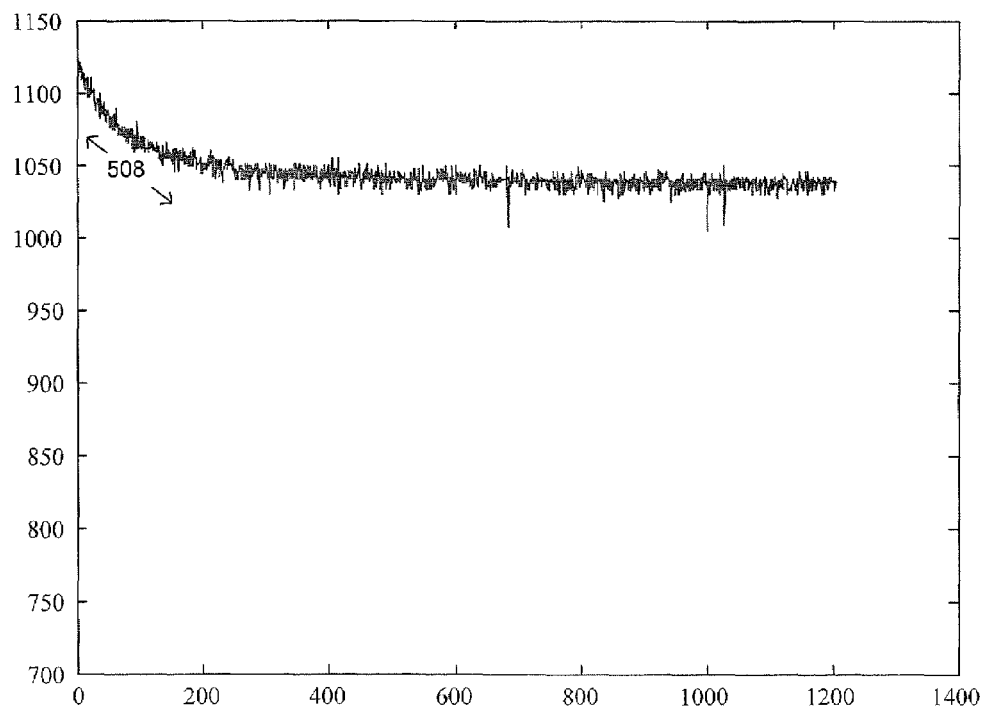
FIG. 5B is a graph illustrating repeatability results for methods of micro actuator gain calibration according to some embodiments.

In addition, the controller 144 may reinitiate the calibration process to calculate the gain adjustment and adjust the gain of the micro actuator control loop, for example, responsive to changes in temperature of the micro actuator 128, responsive to detecting a read error rate that is greater than a predetermined threshold, and/or at predetermined times, such as when power is applied to the disk drive. FIG. 5A is a graph illustrating repeatability results for conventional methods of micro actuator gain calibration, while FIG. 5B is a graph illustrating repeatability results for methods of micro actuator gain calibration according to some embodiments. In FIGS. 5A and 5B, calibration of the micro actuator is performed when power is applied to the disk drive. As such, the x-axis represents the number of times power to the disk drive is repeatedly cycled (i.e., the number of power-ons), while the y-axis represents the resulting calibration values. As shown in FIG. 5A, there is a considerable "swing" 507 in the calibration values provided by the conventional methods, ranging from about 875 to about 1025 over about 1200 power cycles.

In contrast, as shown in FIG. 5B, the calibration values provided according to some embodiments are much more consistent, ranging from about 1030 to about 1050 from about 200 to about 1200 power cycles using the same calibration scale. Accordingly, the micro actuator calibration process according to some embodiments may provide improved consistency and/or repeatability as compared to conventional methods. It should be noted that the "slope" 508 in the calibration values for the first 200 power cycles illustrated in FIG. 5B is due to a "warm-up" period for the micro actuator 128, during which the temperature of the micro actuator 128 increases from an initial value to a relatively stable operating temperature. As such, in some embodiments, it may be advantageous to re-calibrate the gain of the micro actuator control loop after the micro actuator 128 has reached its stable operating temperature. For example, the gain of the micro actuator control loop may be adjusted periodically and/or intermittently at predetermined times after power is applied to the disk drive, and/or responsive to detecting changes in temperature of the micro actuator 128 beyond a predetermined value.

Figure 6:
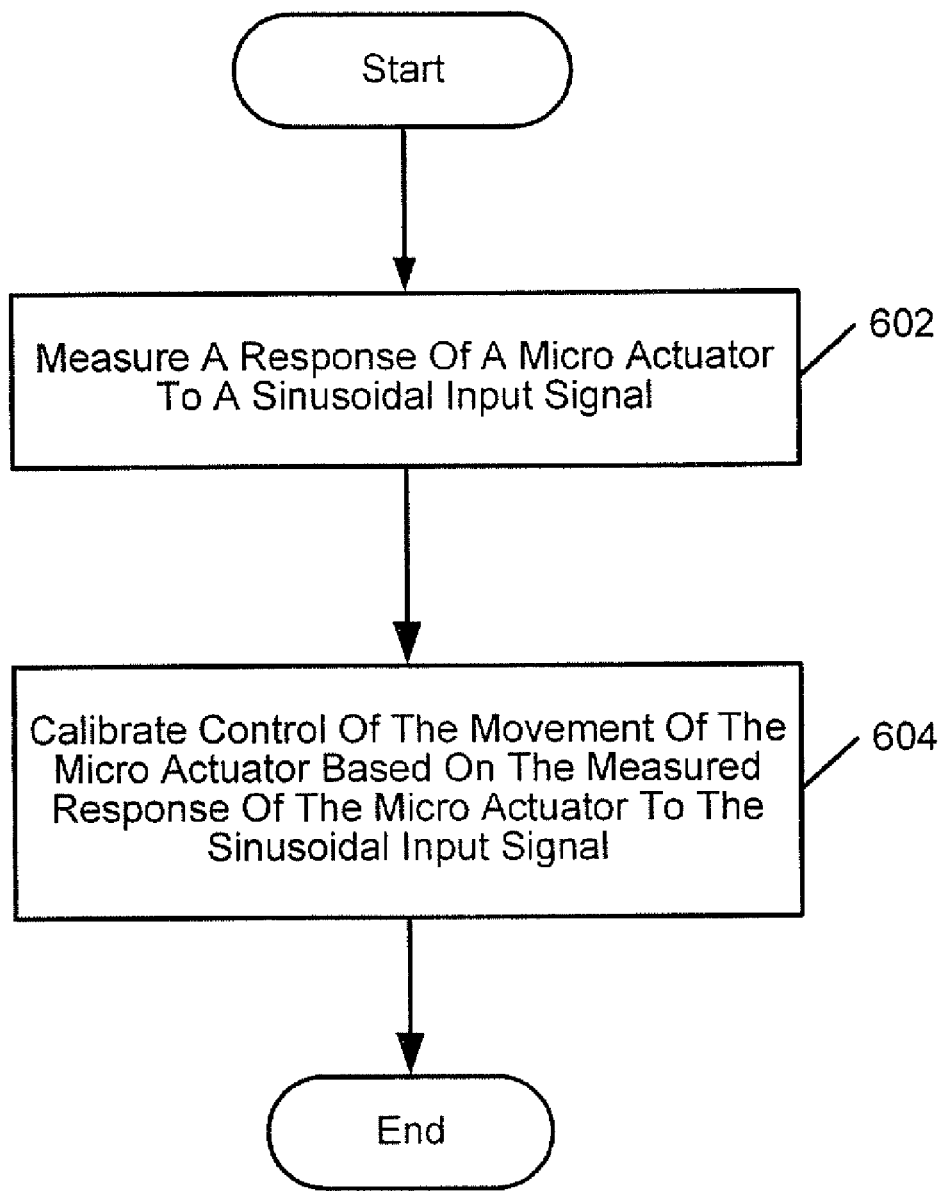
FIG. 6 is a flowchart illustrating operations for calibrating control of the movement of a micro actuator according to some embodiments.

FIG. 6 is a flowchart illustrating operations for calibrating control of micro actuator 128 movement according to some embodiments. Referring now to FIG. 6, a response of the micro actuator 128 to a sinusoidal input signal 526 is measured (at Block 602). For example, the sinusoidal input signal 526 may be provided to the micro actuator 128 when the micro actuator control loop is in an open loop mode so that the transducer 132 may follow a target track based only on control by the coarse actuator 140. The sinusoidal input signal 526 may have a frequency that is greater than the response bandwidth of the coarse actuator control loop, such that substantially all of the movement of the transducer 132 in response to the sinusoidal input signal 526 may be attributable to positioning by the micro actuator 128. The response of the micro actuator 128 may be measured based on changes in radial location of the transducer 132 responsive to the sinusoidal input signal 526. More particularly, a position error signal may be generated based on a read signal from the transducer 132 indicating changes in the radial location of the transducer 132 responsive to the sinusoidal input signal 526, and a discrete Fourier transform (DFT) algorithm may be applied to the position error signal to measure an output amplitude representing the movement of the transducer 132 away from a predetermined radial location.

Control of the movement of the micro actuator 128 is calibrated based on the measured response of the micro actuator 128 to the sinusoidal input signal 526 (at Block 604). For instance, a gain of the micro actuator control loop may be adjusted based on the measured changes in radial location of the transducer 132 in response to the sinusoidal input signal 526. In particular, a measured micro actuator gain may be determined based on the measured output amplitude and the amplitude of the sinusoidal input signal 526, and a gain adjustment for the micro actuator control loop may be calculated based on the measured micro actuator gain and a desired and/or expected micro actuator gain. In some embodiments, the gain adjustment may also be calculated based on a contribution of the coarse actuator control loop to the changes in radial location of the transducer 132. For example, a response of the coarse actuator control loop to the sinusoidal input signal 526 may be measured by applying a DFT algorithm to the resulting position error signal, and the coarse actuator control loop gain may be determined based on the measured response. The gain of the micro actuator control loop may thereby be adjusted based on the calculated gain adjustment to equalize the movement of the micro actuator 128 in accordance with a desired and/or expected gain.

Figure 7:
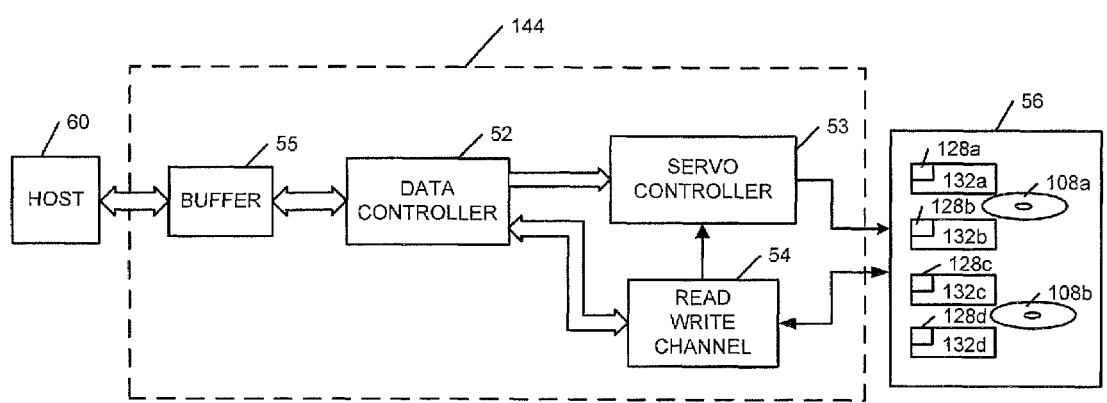
FIG. 7 is a block diagram illustrating a controller in a disk drive according to further embodiments.

FIG. 7 is a block diagram illustrating the controller 144 in the disk drive 100 in greater detail according to further embodiments. As shown in FIG. 7, the controller 144 can include a data controller 52, a servo controller 53, a read write channel 54, and a buffer 55 that is configured to receive instructions/commands from a host device 60. The servo controller 53 may include the control unit 508, the micro actuator compensator 502, and the coarse actuator compensator 506 of FIG. 2. Although the controllers 52 and 53, the buffer 55, and the read write channel 54 have been shown as separate blocks for purposes of illustration and discussion, it is to be understood that their functionality as described herein may be integrated within a common integrated circuit package or distributed among more than one integrated circuit package. The head disk assembly (HDA) 56 can include a plurality of the disks 108*a-b*, a plurality of the transducers 132*a-d* mounted to the actuator arm assembly 116 and positioned adjacent to different data storage surfaces of the disks 108*a-b*, a plurality of micro actuators 128*a-d* corresponding to the plurality of transducers 132*a-d*, the coarse actuator 140, and the spindle motor 14.

Write commands and associated data from the host device 60 are buffered in the buffer 55. The data controller 52 carries out buffered write commands by formatting the associated data into blocks with the appropriate header information, and transferring the formatted data from the buffer 55, via the read/write channel 54, to data sectors along one or more tracks on the disk 108*a-b* identified by the associated write command.

The read write channel 54 can operate in a conventional manner to convert data between the digital form used by the data controller 52 and the analog form conducted through the transducers 132*a-d* in the HDA 56. The read write channel 54 also provides servo positional information read from the HDA 56 to the servo controller 53. More particularly, servo sectors on each of the disks 108*a-b* can include transducer location information, such as a track identification field and data block address, for identifying the track and data block, and burst fields to provide servo fine location information. The transducer location information is induced into one or more of the transducers 132*a-d*, converted from analog signals to digital data in the read/write channel 54, and transferred to the servo controller 53. The servo positional information can be used to detect the location of the transducers 132*a-d* in relation to target data sectors on the disks 108*a-b*. The servo controller 53 can use target data sectors from the data controller 52 and the servo positional information to seek the transducers 132*a-d* to an addressed track and data sector on the disks 108*a-b*, and to maintain the transducers 132*a-d* aligned with the track while data is written/read on one or more identified data sectors.

Accordingly, in some embodiments, the servo controller 53 may separately calibrate control of the movement of each of the micro actuators 128*a*-128*d* based on the measured response of each the micro actuators 128*a*-128*d* to a sinusoidal input signal, for example, in a manner similar to that described above with reference to FIG. 2. For example, the servo controller 53 may measure an open loop response of each of the micro actuator control loops corresponding to each of the micro actuators 128*a-d* based on the movement of the corresponding transducers 132*a-d* responsive to providing a sinusoidal input signal to each of the micro actuators 128*a-d*, and may separately calibrate gains of the corresponding micro actuator control loops based on the open loop responses. The servo controller 53 may store calibration results for the micro actuator control loops including the plurality of gains, for example, in a table. In addition, the servo controller 53 may separately calibrate the gains for the micro actuator control loops under predetermined conditions. For example, the servo controller 53 may separately reinitiate calibration of the gain of one of the micro actuator control loops responsive to detecting that a read error rate for a corresponding one of the plurality of transducers 132*a-d* has exceeded a predetermined threshold, and/or responsive to detecting that a temperature of a corresponding one of the micro actuators 128*a-d* has exceeded a predetermined value.

In the drawings and specification, there have been disclosed typical preferred embodiments and, although specific terms are employed, they are used in a generic and descriptive sense only and not for purposes of limitation, the scope being set forth in the following claims.

That which is claimed:

1. A method of calibrating control of movement of a micro actuator, the method comprising:
    measuring a response of the micro actuator to a sinusoidal input signal; and
    calibrating control of the movement of the micro actuator based on the measured response of the micro actuator to the sinusoidal input signal.

2. The method of claim 1, wherein measuring the response of the micro actuator comprises measuring an open loop response of a micro actuator control loop that controls movement of the micro actuator responsive to providing the sinusoidal input signal, and wherein calibrating control of the movement of the micro actuator comprises calibrating a gain of the micro actuator control loop based on the open loop response.

3. The method of claim 2, wherein measuring the open loop response of the micro actuator control loop comprises:
    positioning a transducer at a predetermined radial location on a target track of a disk;
    controlling a coarse actuator in response to measurements of transducer location relative to the target track; and
    inhibiting feedback of the measurements of the transducer location to the micro actuator while measuring the response of the micro actuator to the sinusoidal input signal.

4. The method of claim 2, wherein calibrating a gain of the micro actuator control loop comprises:
    adjusting the gain of the micro actuator control loop at predetermined times.

5. The method of claim 2, wherein calibrating the gain of the micro actuator control loop comprises:
    adjusting the gain of the micro actuator control loop responsive to detecting changes in temperature of the micro actuator.

6. The method of claim 2, wherein calibrating the gain of the micro actuator control loop comprises:
    adjusting the gain of the micro actuator control loop responsive to detecting a read error rate that is greater than a predetermined threshold.

7. The method of claim 2, wherein calibrating the gain of the micro actuator control loop comprises:
    separately calibrating a plurality of gains of the micro actuator control loop for corresponding ones of a plurality of micro actuators connected thereto to control movement of corresponding ones of a plurality of transducers on a plurality of disks of a disk drive; and
    storing calibration results including the plurality of gains in a table in a controller of the disk drive.

8. The method of claim 1, wherein measuring the response of the micro actuator comprises measuring a change in radial location of a transducer connected to the micro actuator responsive to the sinusoidal input signal, and wherein calibrating control of the movement of the micro actuator comprises regulating a gain of a micro actuator control loop that controls movement of the micro actuator based on the measured change in radial location of the transducer.

9. The method of claim 8, wherein measuring the change in radial location comprises:
    applying a discrete Fourier transform (DFT) algorithm to measurements of the change in radial location of the transducer responsive to the sinusoidal input signal.

10. The method of claim 9, wherein applying the DFT algorithm to measurements of the change in radial location comprises:
    generating a position error signal based on a read signal from the transducer indicating changes in radial location of the transducer responsive to the sinusoidal input signal; and
    applying the discrete Fourier transform (DFT) algorithm to the position error signal to measure an output amplitude representing movement of the transducer away from a predetermined radial location in response to the sinusoidal input signal.

11. The method of claim 10, wherein regulating the gain of the control loop comprises:
    determining a measured micro actuator gain based on the measured output amplitude and an amplitude of the sinusoidal input signal;
    calculating a gain adjustment based on the measured micro actuator gain and an expected micro actuator gain; and
    adjusting the gain of the micro actuator control loop in accordance with the expected micro actuator gain based on the calculated gain adjustment.

12. The method of claim 11, further comprising:
    estimating a contribution of a coarse actuator control loop that controls movement of a coarse actuator connected to the transducer to the changes in radial location of the transducer responsive to the sinusoidal input signal,
    wherein calculating the gain adjustment further comprises calculating the gain adjustment based on the contribution of the coarse actuator control loop.

13. The method of claim 12, wherein estimating the contribution of the coarse actuator control loop comprises:
    providing the sinusoidal input signal to the coarse actuator control loop;
    inhibiting feedback of measurements of transducer location relative to a target track to the micro actuator while the sinusoidal input signal is provided to the coarse actuator;
    measuring a closed loop response of the coarse actuator control loop to the sinusoidal input signal; and
    determining a gain of the coarse actuator control loop at a frequency of the sinusoidal input signal based on the closed loop response of the coarse actuator control loop and the sinusoidal input signal,
    wherein calculating the gain adjustment comprises calculating the gain adjustment based on the measured micro actuator gain, the expected micro actuator gain, and the gain of the coarse actuator control loop.

14. The method of claim 13, wherein calculating the gain adjustment comprises calculating the gain adjustment based on the following equation:

$$K_{adjustment} = (K_{expected} \times K_{ETF}) / K_{measured},$$

wherein $K_{adjustment}$ is the gain adjustment for the micro actuator control loop, wherein $K_{measured}$ is the measured gain of the micro actuator, wherein $K_{expected}$ is the expected micro actuator gain, and wherein $K_{ETF}$ is the gain of the coarse actuator control loop.

15. The method of claim 8, wherein a frequency of the sinusoidal input signal is greater than a response bandwidth of a coarse actuator control loop that controls movement of a coarse actuator connected to the transducer such that substantially all of the change in radial location of the transducer is attributable to positioning by the micro actuator.

16. The method of claim 15, wherein the frequency of the sinusoidal input signal is about 2.4 kHz.

17. The method of claim 1, wherein measuring the response of the micro actuator comprises:
- positioning a transducer connected to the micro actuator at a first radial location on a first target track of a disk;
- measuring a change in radial location of the transducer relative to the first radial location responsive to providing the sinusoidal input signal;
- positioning the transducer at a second radial location on a second target track of a disk; and
- measuring a change in radial location of the transducer relative to the second radial location responsive to providing the sinusoidal input signal,
- wherein calibrating control of the movement of the micro actuator comprises calibrating a gain of a micro actuator control loop that controls movement of the micro actuator based on the measured changes in radial location relative to the first and second radial locations.

18. A circuit, comprising:
- a control unit that measures a response of a micro actuator to a sinusoidal input signal; and
- a micro actuator compensator that calibrates control of movement of the micro actuator based on the measured response of the micro actuator to the sinusoidal input signal.

19. The circuit of claim 18, wherein the control unit further measures a change in radial location of a transducer connected to the micro actuator responsive to the sinusoidal input signal and regulates a gain of a micro actuator control loop including the micro actuator compensator that controls movement of the micro actuator based on the measured change in radial location of the transducer.

20. The circuit of claim 19, wherein the control unit applies a discrete Fourier transform (DFT) algorithm to measurements of changes in radial location of the transducer responsive to the sinusoidal input signal to measure an output amplitude representing movement of the transducer away from a predetermined radial location in response to the sinusoidal input signal.

21. The circuit of claim 20, wherein the control unit determines a measured micro actuator gain based on the measured output amplitude and an amplitude of the sinusoidal input signal, calculates a gain adjustment based on the measured micro actuator gain and an expected micro actuator gain, and adjusts the gain of the micro actuator control loop in accordance with the expected micro actuator gain based on the calculated gain adjustment.

22. The circuit of claim 21, wherein the control unit further estimates a contribution of a coarse actuator control loop that controls movement of a coarse actuator connected to the transducer to the changes in radial location of the transducer responsive to the sinusoidal input signal, and calculates the gain adjustment based on the contribution of the coarse actuator control loop.

23. A disk drive, comprising:
- a rotatable data storage disk;
- a transducer that is adjacent to the rotatable storage disk;
- a micro actuator that positions the transducer over a first range of movement;
- a coarse actuator that positions the micro actuator over a second range of movement that is larger than the first range of movement; and
- a controller that controls positioning of the transducer by the coarse actuator based on a coarse actuator control loop and by the micro actuator based on a micro actuator control loop, wherein the controller measures an open loop response of the micro actuator control loop to a sinusoidal input signal and calibrates a gain of the micro actuator control loop based on the measured open loop response.

24. The disk drive of claim 23, wherein the controller measures a change in radial location of the transducer responsive to the sinusoidal input signal and regulates the gain of the micro actuator control loop based on the measured change in radial location of the transducer.

25. The disk drive of claim 24, wherein the controller applies a discrete Fourier transform (DFT) algorithm to measurements of changes in radial location of the transducer responsive to the sinusoidal input signal.

26. The disk drive of claim 25, wherein the controller generates a position error signal based on a read signal from the transducer indicating changes in radial location of the transducer responsive to the sinusoidal input signal, and applies the discrete Fourier transform (DFT) algorithm to the position error signal to measure an output amplitude representing movement of the transducer away from a predetermined radial location on the disk in response to the sinusoidal input signal.

27. The disk drive of claim 26, wherein the controller determines a measured micro actuator gain based on the measured output amplitude and an amplitude of the sinusoidal input signal, calculates a gain adjustment based on the measured micro actuator gain and an expected micro actuator gain, and adjusts the gain of the micro actuator control loop in accordance with the expected micro actuator gain based on the calculated gain adjustment.

28. The disk drive of claim 27, wherein the controller further estimates a contribution of the coarse actuator control loop to the changes in radial location of the transducer responsive to the sinusoidal input signal, and calculates the gain adjustment based on the contribution of the coarse actuator control loop.

* * * * *